United States Patent
Shibata

(10) Patent No.: US 8,289,407 B2
(45) Date of Patent: Oct. 16, 2012

(54) IMAGING APPARATUS AND IMAGING METHOD

(75) Inventor: Nobuhiro Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 12/402,217

(22) Filed: Mar. 11, 2009

(65) Prior Publication Data

US 2009/0231444 A1    Sep. 17, 2009

(30) Foreign Application Priority Data

Mar. 11, 2008  (JP) ................................ 2008-061859

(51) Int. Cl.
   *H04N 5/228* (2006.01)
(52) U.S. Cl. ................................ 348/208.99; 348/208.1
(58) Field of Classification Search ............. 348/208.99, 348/208.1
   See application file for complete search history.

(56) References Cited

U.S. PATENT DOCUMENTS

| 6,064,826 A | * | 5/2000 | Washisu | 396/55 |
| 2005/0270380 A1 | * | 12/2005 | Tomita et al. | 348/208.99 |
| 2006/0176732 A1 | * | 8/2006 | Chan et al. | 365/154 |

FOREIGN PATENT DOCUMENTS

| JP | 7-199263 A | 8/1995 |
| JP | 2000-180171 A | 6/2000 |
| JP | 2001-054005 A | 2/2001 |
| JP | 2001-516160 A | 9/2001 |
| JP | 2004-159051 A | 6/2004 |
| JP | 2007-088829 A | 4/2007 |

* cited by examiner

Primary Examiner — Anthony J Daniels

(74) Attorney, Agent, or Firm — Canon USA Inc IP Division

(57) ABSTRACT

An imaging apparatus includes a correction member movable within a plane orthogonal to an optical axis, a vibration detection unit configured to detect vibrations applied to the imaging apparatus, a filter configured to pass a frequency of a predetermined band of vibration signals from the vibration detection unit, a calculation unit configured to calculate a vibration correction amount based on an output from the filter, a driving control unit configured to drive the correction member by using the vibration correction amount to perform vibration correction, and an intermediate value changing unit configured to change an intermediate value of the filter unit to a predetermined value immediately before exposure.

8 Claims, 9 Drawing Sheets

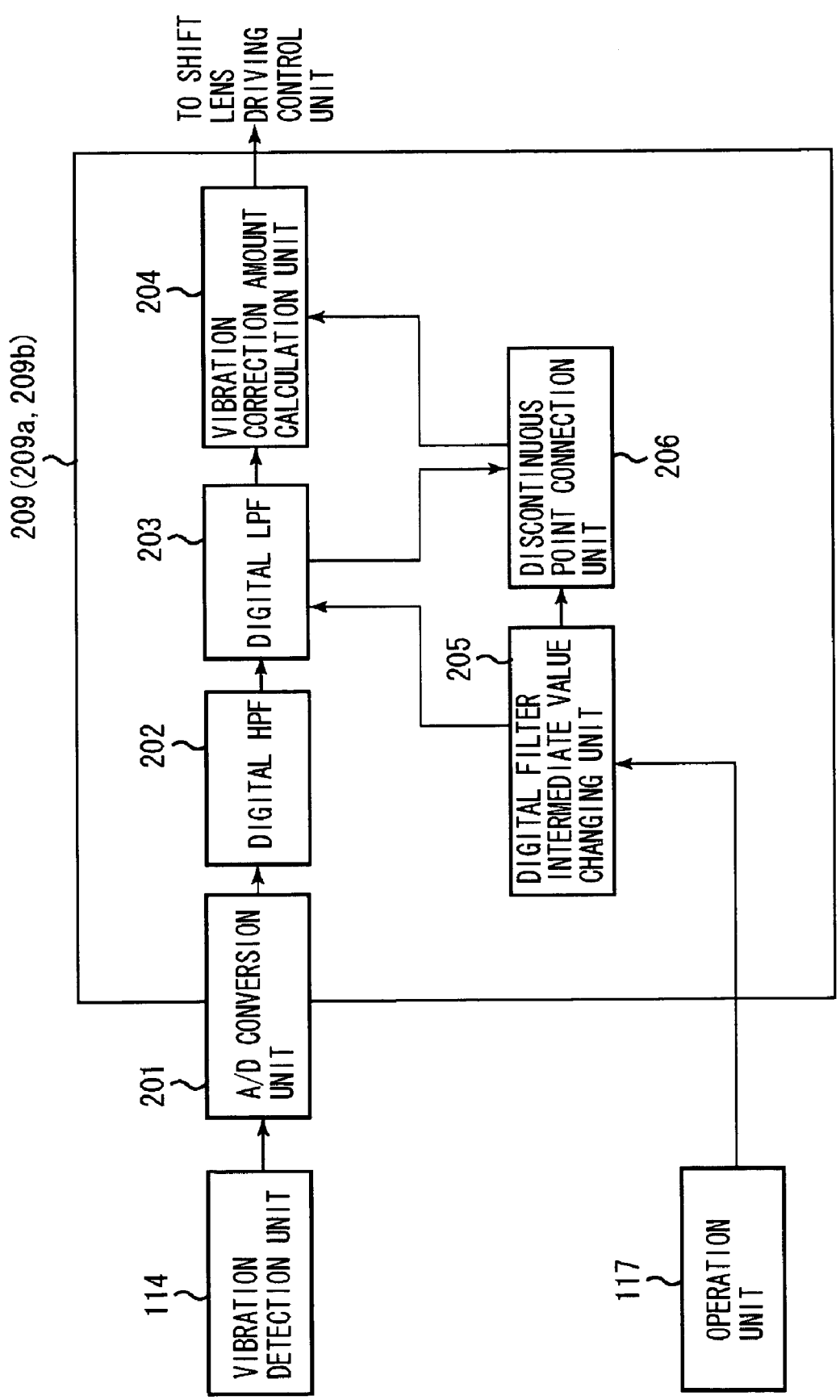

FIG. 9D (PRIOR ART)     $Z[n] = Z[n-1] \times a + X[n]$
$Y[n] = Z[n] \times b + Z[n-1] \times c$ a, b AND c ARE CONSTANTS, AND FILTER CHARACTERISTICS CHANGE DEPENDING ON SIGNS THEREOF FIG. 9F (PRIOR ART)    $Y[n] = X[n] \times a + X[n-1] \times b$ a, AND b ARE CONSTANTS, AND FILTER CHARACTERISTICS CHANGE DEPENDING ON SIGNS THEREOF

IMAGING APPARATUS AND IMAGING METHOD

BACKGROUND OF THE INVENTION

1. Field of the Invention

The present invention relates to an imaging apparatus which has an image stabilizing function.

2. Description of the Related Art

An imaging apparatus typified by a still camera or a video camera has an optical image stabilizing system or an image sensor image stabilizing system available as a system for correcting vibrations such as camera shakes applied to the apparatus from the outside.

These systems perform digital signal processing on a signal from a vibration detection sensor which detects a vibration degree, via an analog-to-digital (A/D) converter, calculate a vibration correction amount to execute digital-to-analog (D/A) conversion, and then drive a correction unit for image stabilizing, i.e., a shift lens or an image sensor.

An angular speed sensor is often used for vibration degree detection. This angular speed sensor vibrates a vibration material such as a piezoelectric element at a constant frequency, and converts Coriolis force generated by a rotational motion component into a voltage to obtain an angular speed signal.

As an apparatus for performing A/D conversion, digital signal processing, or D/A conversion, a microcomputer is used which includes a filter for cutting off a plurality of predetermined frequencies and an integration filter. Recursive digital filters are available as such filters. The recursive digital filter includes a feed-forward unit and a feedback unit.

FIG. 9A is an overall block diagram of a recursive primary digital filter. The recursive digital filter includes a feed-forward unit and a feedback unit. In the recursive digital filter, an intermediate value is a calculation result of the feedback unit. In this case, an intermediate value Z[n] is obtained at current sampling. A value after passage through a delay element $Z^{-1}$ was obtained at last sampling. This delay element determines a digital filter order.

FIG. 9B illustrates the feedback unit cut out from the recursive digital filter. An intermediate value Z[n] of current sampling is calculated from an input value X[n] of the current sampling and an intermediate value Z[n−1] of last sampling, where n denotes a number of sampling times. FIG. 9C illustrates the feed-forward unit cut out from the recursive digital filter. An output value Y[n] of the current sampling is calculated from the intermediate value Z[n] of the current sampling and the intermediate value Z[n−1] of the last sampling. FIG. 9D illustrates an operational expression when gains of the feed-forward unit and the feedback unit are respectively set to constants a, b, and c.

FIG. 9E is an overall block diagram of a nonrecursive primary digital filter. Unlike the recursive digital filter, the nonrecursive digital filter includes only a feed-forward unit. An input value X[n] is obtained at current sampling, and an input value X[n−1] of last sampling is an intermediate value in the nonrecursive digital filter. In other words, in the nonrecursive digital filter, a value after passage through the delay element $Z^{-1}$ is an intermediate value. FIG. 9F illustrates an operational expression when gains of the feed-forward unit are set to constants a and b.

To obtain a filter having desired characteristics, values and signs of the constants a, b, and c are appropriately set. By setting these constants appropriately, a digital high-pass filter or a digital low-pass filter can be realized.

Secondary or higher-order digital filters are realized by increasing delay elements $Z^{-1}$. The number of intermediate values is increased according to an order.

The optical image stabilizing system corrects image vibrations on the image sensor (removes image vibrations from an image formed on the image sensor) by moving the shift lens which is a correction unit for image stabilizing within a plane orthogonal to an optical axis by a vibration correction amount. The image sensor image stabilizing system corrects image vibrations on the image sensor by moving the image sensor which is a correction unit for image stabilizing within the plane orthogonal to the optical axis by a vibration correction amount. The present invention described below can be applied to both systems, and thus the optical image stabilizing system will be described below as a representative example.

In the imaging apparatus having the image stabilizing function of the aforementioned system, a shift lens drive unit is instructed to move by a vibration correction amount. When the shift lens that is a control target reaches a driving target position, a real position of the shift lens is obtained. Feedback control is performed to reduce a deviation between the driving target position and the real position to zero.

A driving range of the shift lens in the optical image stabilizing system is determined by a mechanical limit or a limit of optical performance. When enabled, the image stabilizing function corrects also vibrations caused by a panning operation in addition to camera shakes. Consequently, an image may not be stabilized correctly when the shift lens is near a driving limit. Thus, Japanese Patent Application Laid-Open No. 7-199263 discusses a technique of returning a shift lens to a predetermined position within a driving range before exposure when a driving amount of the shift lens is large.

According to the technique discussed in Japanese Patent Application Laid-Open No. 7-199263, the shift lens is returned to the predetermined position before exposure when the driving amount of the shift lens for image stabilizing is large. Thus, a driving range can be secured even when the shift lens is near the driving limit.

When the digital low-pass filter is used, however, if an intermediate value is large even when a vibration correction amount which is an output of the digital filter is changed by a predetermined amount, the output is increased immediately after the change is made by the predetermined amount. As a consequence, the driving amount becomes large again within a short time. When the intermediate value is large, the image may not be stabilized correctly because the intermediate value of the digital low-pass filter works to reduce a final output of the digital filter.

SUMMARY OF THE INVENTION

The present invention is directed to an imaging apparatus or method capable of performing appropriate image stabilization by changing an intermediate value of a digital low-pass filter which includes a delay element to a predetermined value immediately before a start of exposure to prevent an increase in a driving amount of a correction unit, in other words, to eliminate an influence of large vibrations caused by a panning operation or the like.

According to an aspect of the present invention, an imaging apparatus includes a correction member movable within a plane orthogonal to an optical axis, a vibration detection unit configured to detect vibrations applied to the imaging apparatus, a filter configured to pass and output a frequency of a predetermined band of vibration signals periodically entered from the vibration detection unit, wherein the filter sets a sum of a value based on a vibration signal of a current period and a value based on a vibration signal of a last period as an intermediate value, and outputs a value obtained by adding together a value based on an intermediate value of the current period and a value based on an intermediate value of the last period, a calculation unit configured to calculate a vibration correction amount based on an output from the filter, a driving control unit configured to drive the correction member by using the vibration correction amount to perform vibration correction, and an intermediate value changing unit configured to change an intermediate value of the filter unit to a predetermined value immediately before exposure.

According to another aspect of the present invention, an imaging apparatus includes a correction member movable within a plane orthogonal to an optical axis, a vibration detection unit configured to detect vibrations applied to the imaging apparatus, a first filter configured to pass and output a frequency of a predetermined band of vibration signals periodically entered from the vibration detection unit wherein the first filter sets a sum of a value based on a vibration signal of a current period and a value based on a vibration signal of a last period as an intermediate value, and outputs a value obtained by adding together a value based on an intermediate value of the current period and a value based on an intermediate value of the last period, a second filter configured to pass a predetermined frequency different from the passed band of the first filter as to the vibration signals from the vibration detection unit, a calculation unit configured to calculate a vibration correction amount based on an output from one of the first and second filters, a driving control unit configured to drive the correction member by using the vibration correction amount to perform vibration correction, and an intermediate value changing unit configured to switch an entry to the calculation unit from the second filter to the first filter immediately before exposure and to change an intermediate value of the first filter to a predetermined value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a block diagram illustrating a configuration of an image stabilizing control unit according to a first exemplary embodiment of the present invention.

FIGS. 9A to 9F illustrate a configuration of a general recursive primary digital filter.

DETAILED DESCRIPTION OF THE EMBODIMENTS

Various exemplary embodiments, features, and aspects of the invention will be described in detail below with reference to the drawings.

Figure 1:
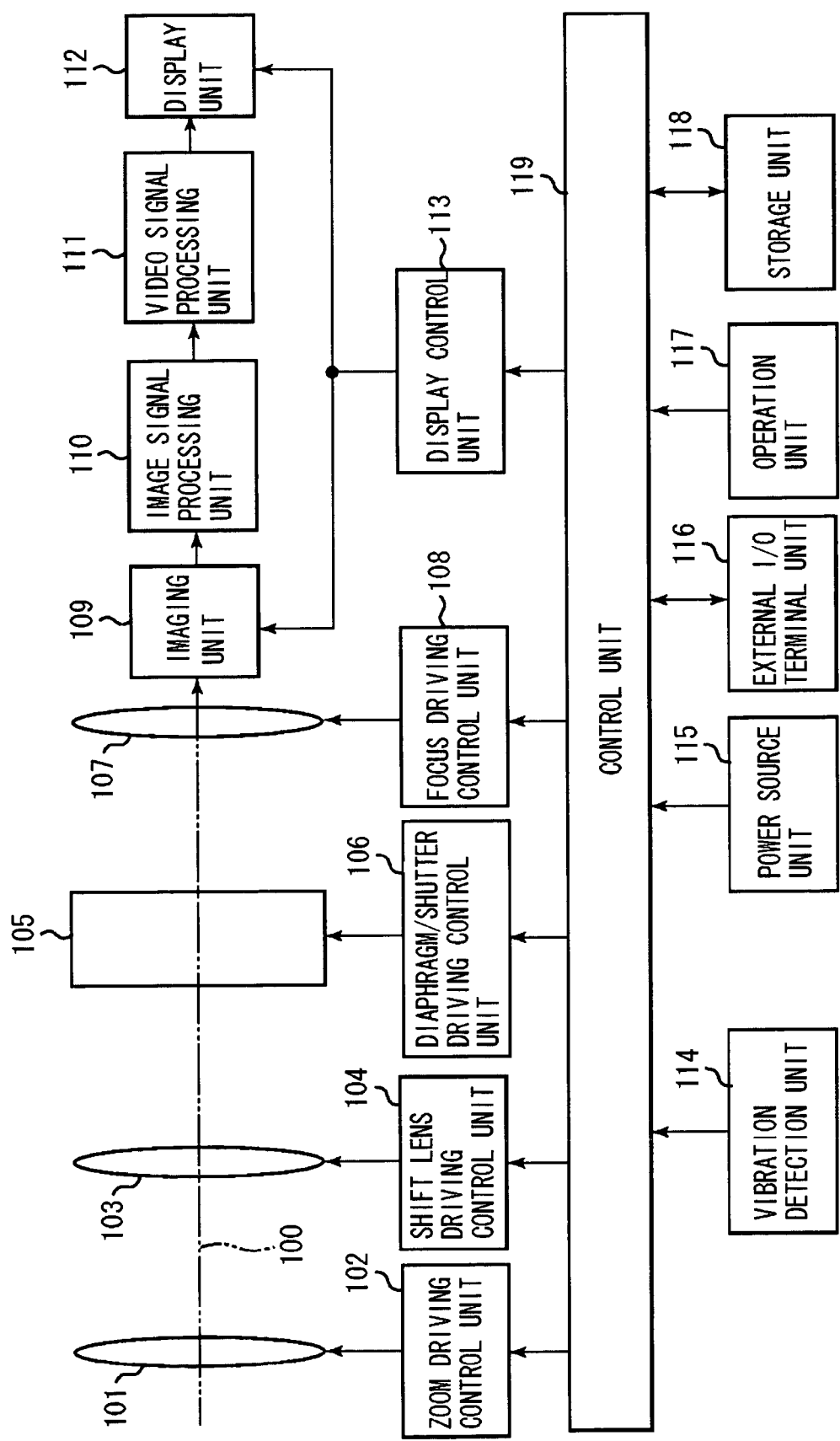
FIG. 1 illustrates a configuration of an imaging apparatus according to an exemplary embodiment of the present invention.

FIG. 1 illustrates a configuration of an imaging apparatus which has an image stabilizing function according to a first exemplary embodiment of the present invention. In FIG. 1, a zoom unit 101 includes a zoom lens for magnification. A zoom driving control unit 102 controls driving of the zoom unit 101. A shift lens 103 as an example of a correction unit for image stabilizing can change its position within a plane orthogonal to an optical axis 100. A shift lens driving control unit 104 controls driving of the shift lens 103. When power is to be saved, a control unit 119 described below stops power supplying to the shift lens driving control unit 104.

The imaging apparatus further includes a diaphragm shutter unit 105. A diaphragm shutter driving control unit 106 controls driving of the diaphragm shutter unit 105. A focus unit 107 includes a lens for focus adjustment. A focus driving control unit 108 controls driving of the focus unit 107. An imaging unit 109 uses an image sensor such as a charge coupled device (CCD), and converts a light image passed through each lens group into an electric signal. An image signal processing unit 110 converts the electric signal output from the imaging unit 109 into a video signal. A video signal processing unit 111 processes the video signal output from the image signal processing unit 110 according to intended use. A display unit 112 displays an image based on the video signal output from the video signal processing unit 111 when necessary. A display control unit 113 controls an operation and display of the imaging unit 109 and the display unit 112.

A vibration detection unit 114 such as an angular speed sensor detects a degree of vibrations applied to the imaging apparatus. A power source unit 115 supplies power to the entire system according to intended use. An external I/O terminal unit 116 enters/outputs a communication signal or a video signal from and to the outside. An operation unit 117 operates the system. A storage unit 118 stores various data such as video information. The control unit 119 controls the entire system.

Next, an operation of the imaging apparatus thus configured will be described.

The operation unit 117 includes a shutter release button configured to sequentially turn ON first and second switches (SW1 and SW2) according to a pressing amount. The first switch is turned ON when the shutter release button is pressed about half, and the second switch is turned ON when the shutter release button is pressed to the maximum. After the first switch is turned ON, the control unit 119 drives the focus unit 107 to adjust a focus via the focus driving control unit 108. Simultaneously, the control unit 119 drives the diaphragm shutter unit 105 via the diaphragm shutter driving control unit 106 to set an appropriate exposure amount. When the second switch is turned ON, the control unit 119 stores image data obtained from an exposure light image formed at the imaging unit 109 in the storage unit 118.

In this case, if instructed to enable the image stabilizing function by the operation unit 117, the control unit 119 instructs the shift lens driving control unit 104 to perform an image stabilizing operation. The shift lens driving control unit 104 that has received the instruction drives the shift lens 103 until an instruction of disabling the image stabilizing function is issued. More specifically, the shift lens driving control unit 104 moves the shift lens 103 in a direction that cancels vibrations within the plane orthogonal to the optical axis 100, to perform an image stabilizing operation.

If the operation unit 117 has not been operated for a given length of time, the control unit 119 cuts off power to the display unit 112 or the shift lens driving control unit 104 to save power.

In the imaging apparatus, the operation unit 117 can select one of static image and moving image shooting modes, and operation conditions of each driving control unit can be changed in each mode.

If instructed to perform magnification by the operation unit 117, the control unit 119 drives the zoom unit 101 via the zoom driving control unit 102 to move it to an instructed zoom position. At the same time, based on image information sent from the imaging unit 109 and processed by the signal processing units 110 and 111, the control unit 119 drives the focus unit 107 to adjust a focus via the focus driving control unit 108.

Figure 2:
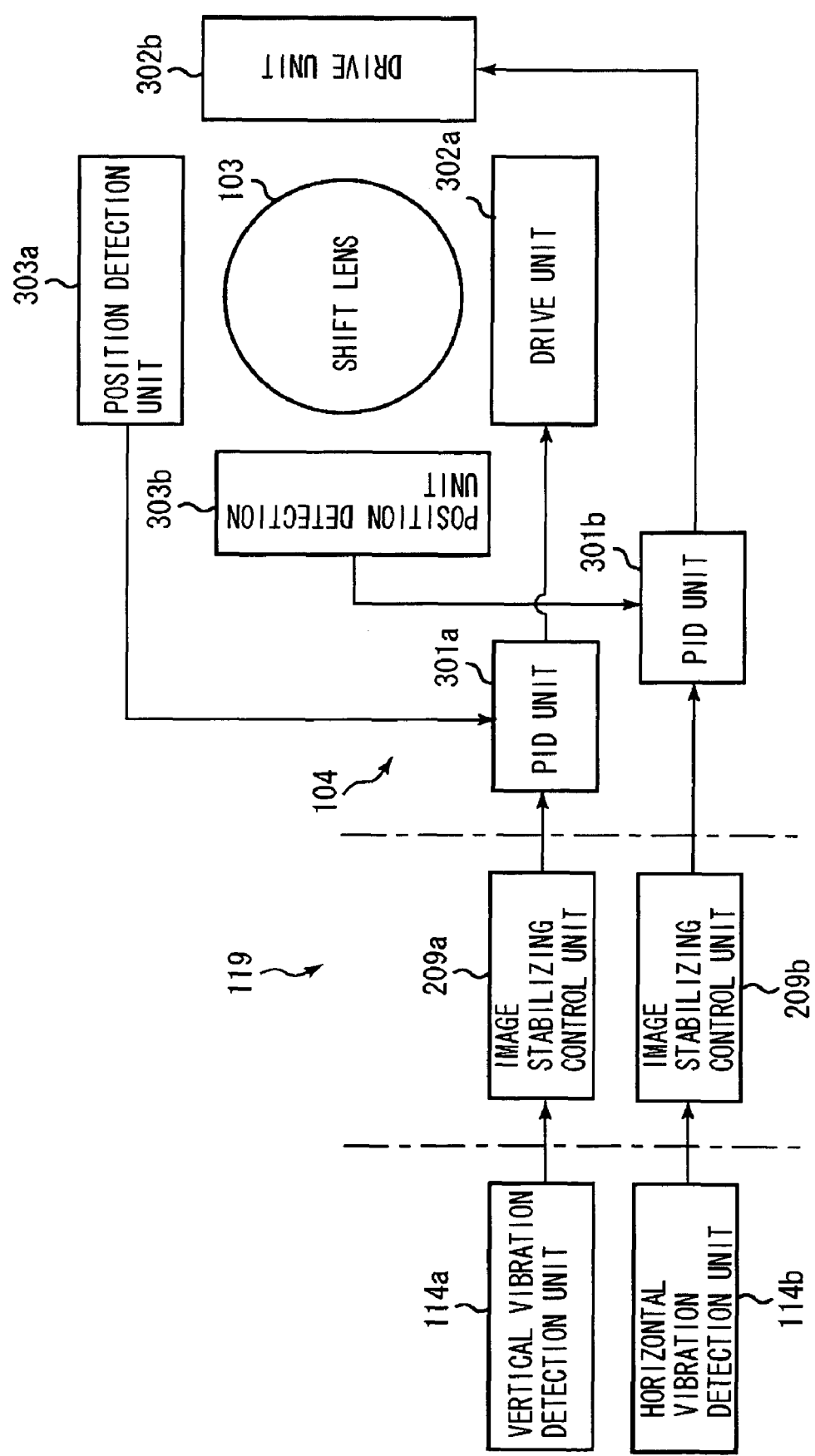
FIG. 2 is a block diagram illustrating a circuitry of a shift lens driving control unit according to the exemplary embodiment of the present invention.

FIG. 2 is a block diagram illustrating an internal configuration of the shift lens driving control unit 104 and a circuitry placed before the same.

First, the configuration placed before the shift lens driving control unit 104 will be described. A vertical vibration detection unit 114a detects vertical (pitch-direction) vibrations of the imaging apparatus in a normal posture. A horizontal vibration detection unit 114b detects horizontal (yaw-direction) vibrations of the imaging apparatus in a normal posture. Image stabilizing control units 209a and 209b included in the control unit 119 calculate vibration correction amounts in pitch and yaw directions to decide a driving target position of the shift lens 103, and outputs them to the shift lens driving control unit 104.

Next, the configuration of the shift lens driving control unit 104 will be described. PID units 301a and 301b that are feedback control units in the pitch and yaw directions obtain control amounts from a deviation between the driving target position and a real position signal (described below) indicating a current position of the shift lens 103 to output position command signals. Drive units 302a and 302b in the pitch and yaw directions drive the shift lens 103 based on the position command signals sent from the PID units 301a and 301b. Position detection units 303a and 303b in the pitch and yaw directions detect current positions of the shift lens 103 in the respective directions to output real position signals to the PID units 301a and 301b.

Next, position control of the shift lens 103 performed by the shift lens driving control unit 104 will be described.

In the position control of the shift lens 103, the shift lens driving control unit 104 drives the shift lens 103 in the pitch and yaw directions based on signals indicating vibrations of the imaging apparatus from the vibration detection units 114a and 114b. A magnet is attached to the shift lens 103. The position detection units 303a and 303b detect a magnetic field of the magnet to output real position signals of the shift lens 103 to the PID units 301a and 301b. The PID units 301a and 301b perform feedback control so that the entered real position signals can converge on the driving target position sent from the image stabilizing control units 209a and 209b. In this case, the PID units 301a and 301b perform PID control in which proportion (P) control, integration (I) control, and differentiation (D) control are selectively combined.

Thus, even when vibrations such as camera shakes occur in the imaging apparatus, the image vibrations can be appropriately corrected.

FIG. 3 is a block diagram illustrating the image stabilizing control unit 209 (209a and 209b) illustrated in FIG. 2.

Figure 9A:
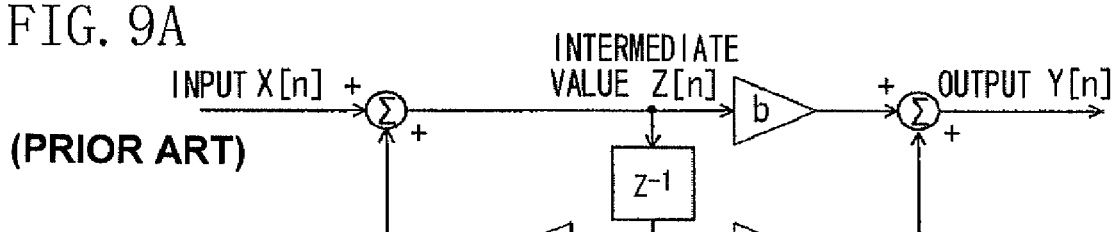

In FIG. 3, an A/D conversion unit 201 converts analog data which is a vibration signal detected by the vibration detection unit 114 (114a and 114b) into digital data. A digital high-pass filter (digital HPF) 202 passes a predetermined high-frequency band. For example, constants a and b in a configuration of a primary filter illustrated in FIG. 9A are filters of positive signs, and a constant c is a filter of a negative sign. A digital low-pass filter (digital LPF) 203 passes a predetermined low-frequency band. For example, the constants a and b in the configuration of the primary filter illustrated in FIG. 9A are filters of positive signs, and the constant c is a filter of a positive sign. Data detected by the vibration detection unit 114 is an angular speed. When the shift lens driving control unit 104 drives and controls the lens shift 103 by an angle, the digital low-pass filter 203 operates as an integrator. The digital HPF 202 and the digital LPF 203 include feedback units because there are recursive digital filters. In the recursive digital filter, an intermediate value is a calculation result of the feedback unit.

A vibration correction amount calculation unit 204 changes a sign of a vibration amount which is an output result of the digital low-pass filter 203 to calculate a vibration correction amount. The vibration correction amount reflects zoom position information from the zoom driving control unit 102 and focus information from the focus driving control unit 108 of FIG. 1. A digital filter intermediate value changing unit 205 changes an intermediate value stored in the digital low-pass filter 203 to a preset predetermined value according to an exposure start signal (ON signal of the second switch) entered from the operation unit 117. A discontinuous point connection unit 206 continuously connects discontinuous points of the output result of the digital low-pass filter 203 generated by the digital filter intermediate value changing unit 205.

A calculation result (driving target position) of the vibration correction amount calculation unit 204 is output to the shift lens driving control unit 104 to start driving of the shift lens 103.

Figure 4A:
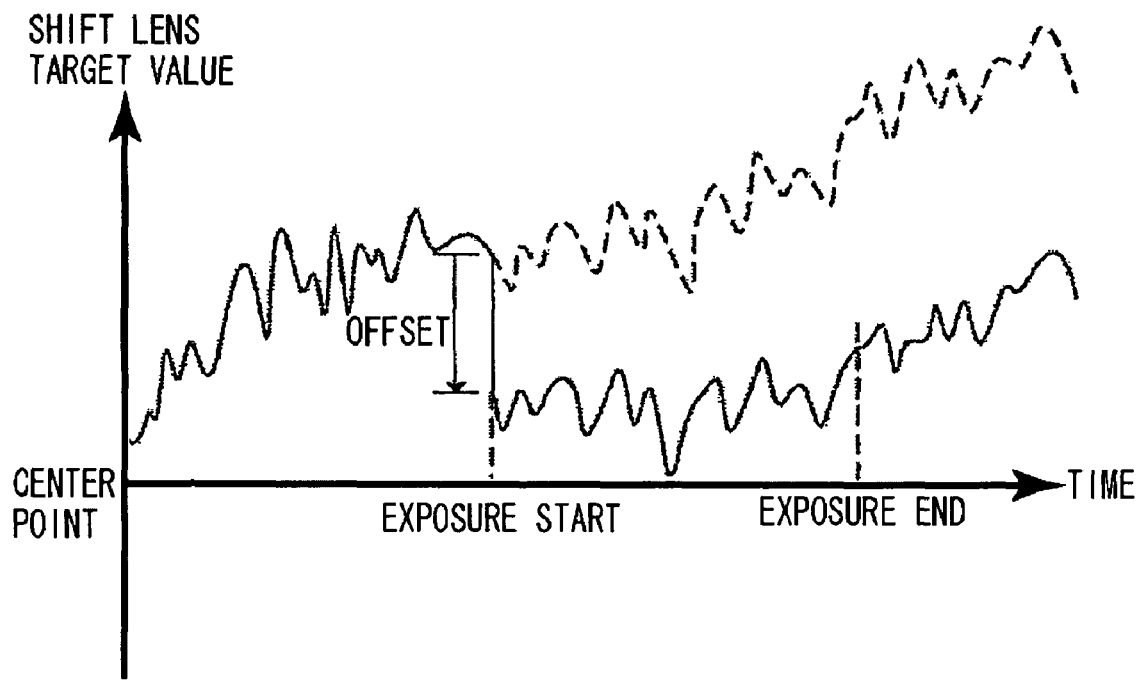
FIGS. 4A and 4B are waveform charts illustrating shift lens target values according to the first exemplary embodiment of the present invention.
Figure 4B:
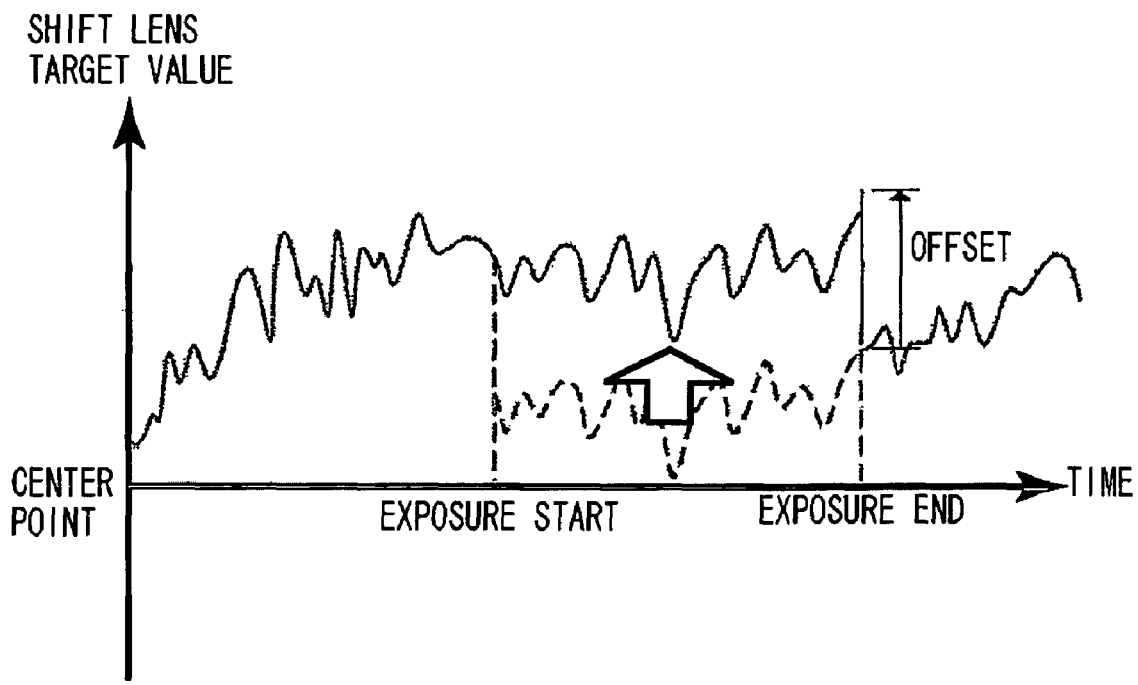

FIGS. 4A and 4B are waveform charts when a digital filter intermediate value is changed, where an X axis is a time axis, a Y axis is a target value of the shift lens 103, an intersection point of the X axes is time zero and an intersection point of the Y axes is a center point (driving center) of a driving range of the shift lens 103. The center point of the driving range is normally an optical axis 100.

The shift lens target value is obtained by changing a sign of the output of the digital low-pass filter 203 and incrementing zoom and focus information at fixed rates.

A broken-line waveform of FIG. 4A indicates a target value calculated when an intermediate value which is a calculation result of the recursive digital filter feedback unit of the digital low-pass filter 203 is not changed even after a start of exposure. In this case, the waveform gradually rises since an influence of an intermediate value of last sampling on an output value of current sampling is accumulated. As a result, the target value approaches the driving limit of the shift lens 103 (away from the center point of the driving range).

A solid-line waveform after the start of exposure in FIG. 4A is obtained when the intermediate value of the digital low-pass filter 203 is changed at the time of starting exposure.

In this case, since the influence of the intermediate value of last sampling on the output value of current sampling is canceled, the influence of accumulation is canceled, resulting in a flat waveform instead of a rising waveform. Thus, when the intermediate value is changed to a predetermined value, the influence of the accumulation can be eliminated unlike a case where an offset amount at the time of starting exposure is subtracted as a constant at the output stage of the digital low-pass filter 203.

In the case of performing control shown in FIG. 4A, the intermediate value of the digital low-pass filter 203 is changed to a predetermined value at the time of starting exposure to set its output value directly as a shift lens target value. This is advantageous in that the shift lens 103 is driven nearer the center point. However, discontinuous points appear at the time of changing the value. The discontinuous points result from a difference, in other words, an offset, between a shift lens target value immediately before and a shift lens target value immediately after the intermediate value is changed.

In the case of performing control shown in FIG. 4B, addition of an offset amount is carried out to continuously connect the discontinuous points generated in FIG. 4A. More specifically, when the intermediate value is changed to the predetermined value, an offset is first calculated and stored. Then, this offset is added to the output of the digital low-pass filter 203. The work of adding the offset is continuously carried out during exposure. Then, the offset addition is finished at end timing of the exposure. This control prevents generation of discontinuous points. As a result, change of a field angle of shooting before or after the start of exposure can be prevented.

The digital low-pass filter 203 passes a predetermined low-frequency band where constants a and b are positive signs and a constant c is a positive sign in the configuration of the primary filter illustrated in FIG. 9A. Desirable specific numerical examples of the constants a, b, and c are a=0.999993, b=0.000003, and c=0.000003 in the case of a cutoff frequency of 0.01 Hz when a sampling cycle is 10 KHz.

Figure 5:
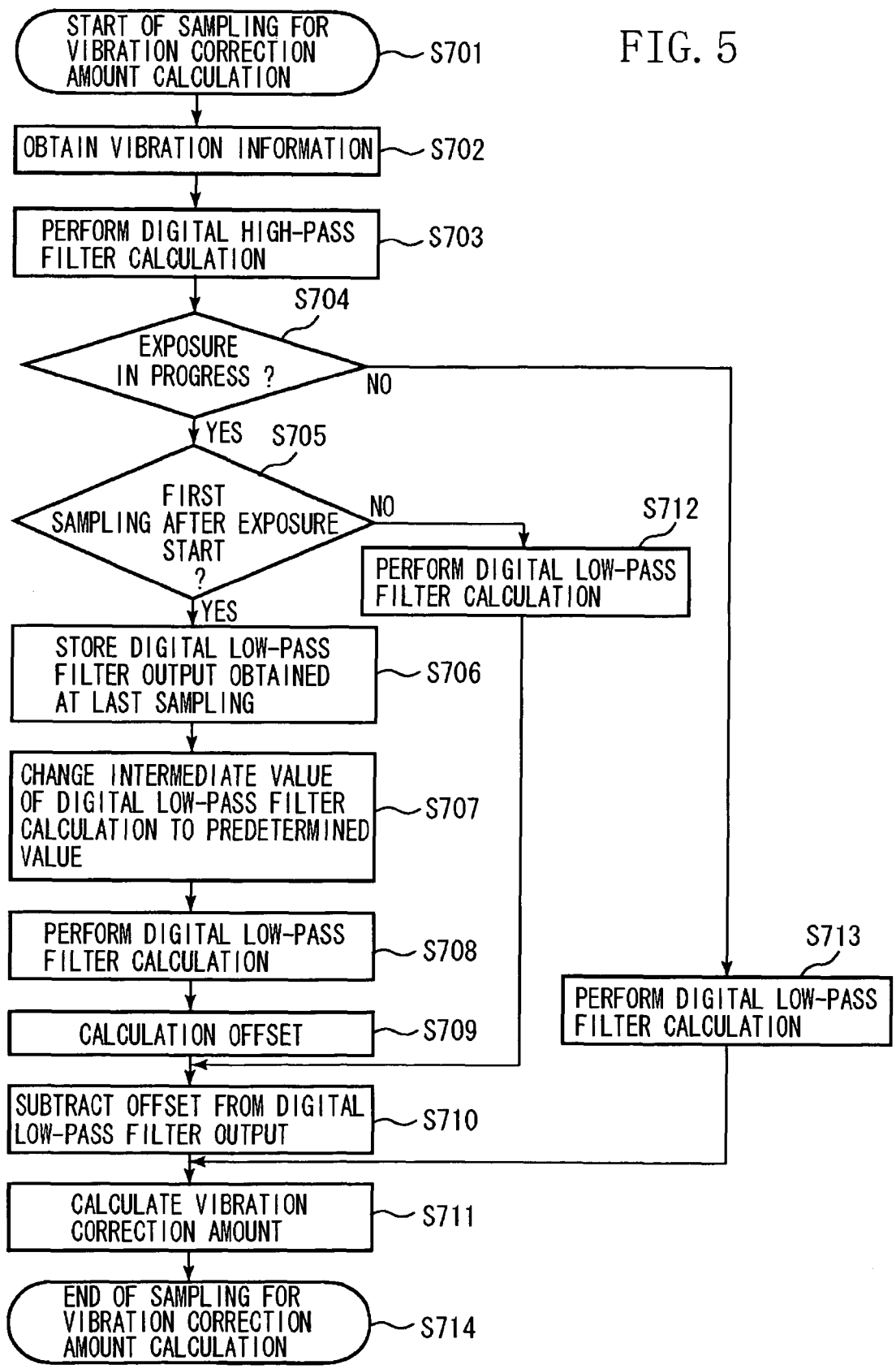
FIG. 5 is a flowchart illustrating an operation for vibration correction amount calculation according to the first exemplary embodiment of the present invention.

Next, referring to a flowchart of FIG. 5, an operation performed by the image stabilizing control unit 209 (digital filter intermediate value changing unit 205 and discontinuous point connection unit 206) according to an exposure start signal from the operation unit 117 will be described when a vibration correction amount is calculated based on a vibration signal from the vibration detection unit 114.

In step S701, the image stabilizing control unit 209 starts sampling for vibration correction amount calculation. In step S702, the image stabilizing control unit 209 obtains a value converted from analog data which is a vibration signal detected by the vibration detection unit 114 into digital data by the A/D conversion unit 201. In step S703, the image stabilizing control unit 209 performs digital high-pass filter calculation. This calculation is performed at the digital high-pass filter 202 where the constant c is a negative sign in the configuration of the primary filter illustrated in FIG. 9A. The digital high-pass filter 202 passes a predetermined high-frequency band, and, for example, serves to cut off a low-frequency band which is a temperature drift component of the vibration detection unit 114.

In step S704, the image stabilizing control unit 209 determines whether exposure is in progress. At a moment when operating the shutter release button disposed in the operation unit 117 turns ON the second switch, exposure starts, and during the ON-period of the second switch, the exposure is in progress. If a result of the determination shows that exposure is not currently in progress (NO in step S704), the image stabilizing control unit 209 proceeds from step S704 to step S713 to perform digital low-pass filter calculation. This calculation is performed at the digital low-pass filter 203 where the constant c is a positive sign in the configuration of the primary filter illustrated in FIG. 9A. The digital low-pass filter 203 passes a predetermined low-frequency band, and, for example, operates as an integrator.

Figure 9B:
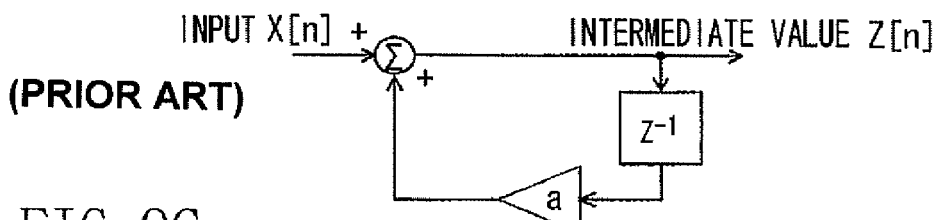
Figure 9C:
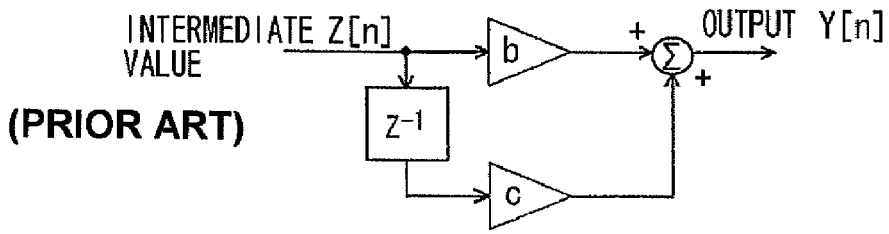

On other hand, if it is determined in step S704 that exposure is currently in progress (YES in step S704), the image stabilizing control unit 209 proceeds to step S705 to determine whether an operation is the first sampling after the start of exposure. If the operation is the first sampling (YES in step S705), the image stabilizing control unit 209 proceeds to step S706 to store a digital low-pass filter output LPFOut(n−1) obtained at last sampling. Then, in step S707, the image stabilizing control unit 209 changes an intermediate value of the digital low-pass filter calculation to a predetermined value. The intermediate value is a variable generated by the feedback unit of FIG. 9B, and commonly appears in simultaneous equations of the feedback unit and the feed-forward unit of FIG. 9D. According to the first exemplary embodiment, the intermediate value is set to zero when the intermediate value is changed to the predetermined value. By setting the intermediate value to zero, image stabilizing driving seems to start from the center point of the driving range. As the predetermined value other than zero, a value may be used which is obtained by subtracting a predetermined value corresponding to an offset amount from a current value. As illustrated in FIG. 4A, the offset amount changes every second when the exposure starts. However, a similar effect can be obtained when a margin (constant) which can prevent a collision with at least a mechanical driving end is subtracted from the intermediate value.

In step S708, the image stabilizing control unit 209 performs digital low-pass filter calculation reflecting the change of the intermediate value to the predetermined value. The result is an output LPFOut (n). If the intermediate value is larger than the predetermined value at a stage before step S707, a vibration correction amount becomes large. As a result, a driving amount of the shift lens 103 is increased. The large intermediate value causes the feed-forward unit of the digital low-pass filter 203 to reduce its output, so that correct image stabilizing may not be achieved. According to the first exemplary embodiment, however, by changing the intermediate value to the predetermined value (e.g., zero), the problem can be addressed.

In step S709, the image stabilizing control unit 209 calculates a difference between the outputs LPFOut(n) and LPFOut(n−1) which become discontinuous points. This difference will be referred to as an offset (FIG. 4A). In step S710, the image stabilizing control unit 209 subtracts the offset from the digital low-pass filter output. Thus, as illustrated in FIG. 4B, the discontinuous points generated after the intermediate value change can be continuously connected.

If it is determined in step S705 that the operation is not first sampling (NO in step S705), the image stabilizing control unit 209 proceeds to step S712 to perform digital low-pass filter calculation. Then, in step S710, by using a precalculated offset, the image stabilizing control unit 209 subtracts the offset from the digital low-pass filter output as in the above case.

In this way, the digital low-pass filter calculation is carried out during the exposure.

After the completion of the exposure, the image stabilizing control unit 209 proceeds to step S713 to perform digital low-pass filter calculation, and does not subtract the offset.

In step S711, the image stabilizing control unit 209 calculates a vibration correction amount by using the calculated digital low-pass filter output. In step S714, the image stabilizing control unit 209 finishes the sampling for the vibration correction amount calculation.

According to the first exemplary embodiment, the image stabilizing control unit 209 changes the intermediate value of the digital low-pass filter 203 to the predetermined value immediately before the start of exposure. Thus, an increase in driving amount of the correction unit can be prevented, in other words, an influence of large vibrations such as a panning operation can be eliminated, to enable appropriate image stabilization.

The image stabilizing control unit 209 continuously reconnects, at the timing of changing the intermediate value to the predetermined value (zero), the discontinuous points of the output of the digital low-pass filter 203 generated after the change. As a result, the discontinuous points generated after the change of the intermediate value can be continuously connected.

Next, an imaging apparatus of a second exemplary embodiment of the present invention will be described. The imaging apparatus has a configuration similar to that illustrated in FIGS. 1 and 2, and thus description thereof will be omitted.

Figure 6:
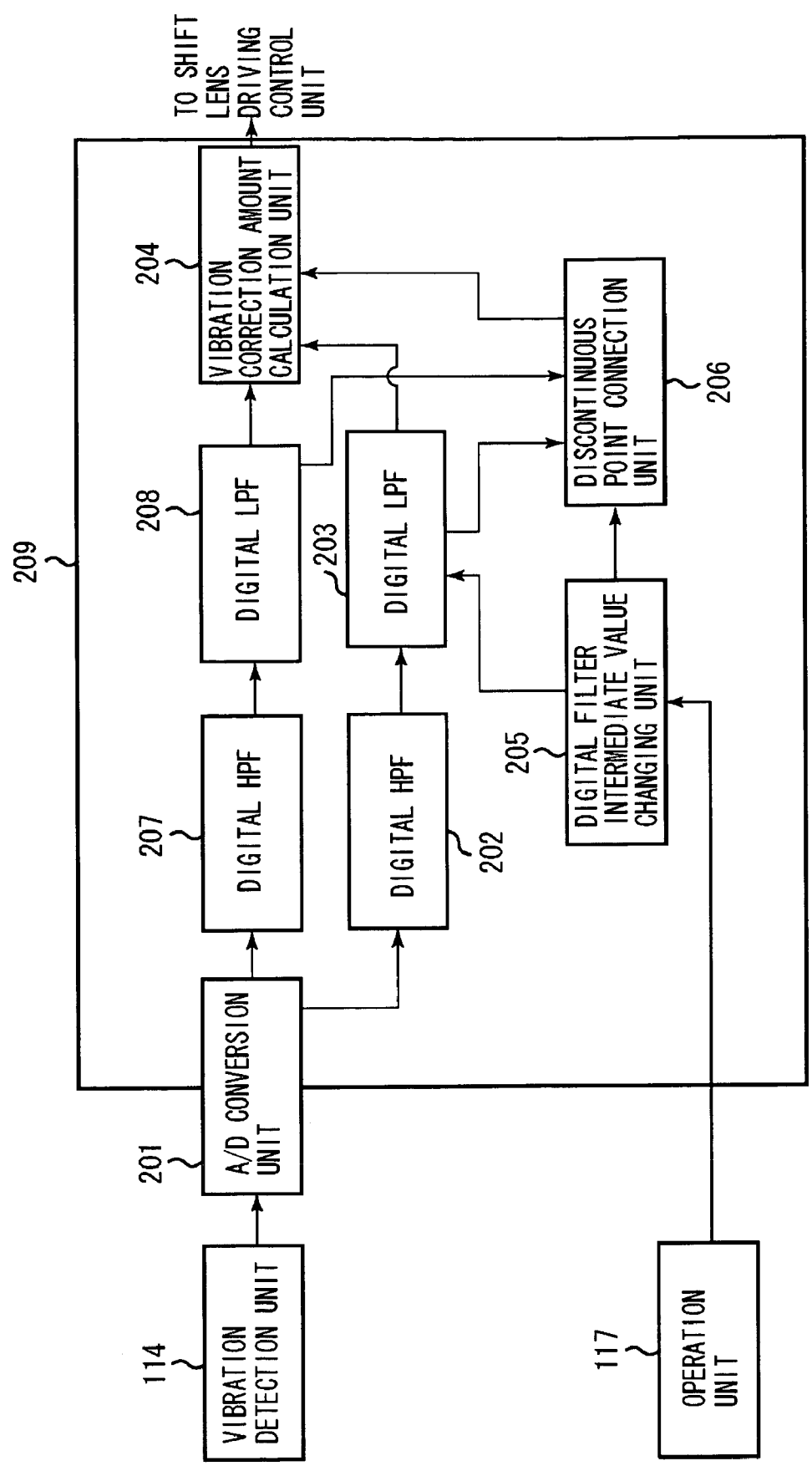
FIG. 6 is a block diagram illustrating a configuration of an image stabilizing control unit according to a second exemplary embodiment of the present invention.

FIG. 6 is a block diagram illustrating an image stabilizing control unit 209 (209a and 209b) of the second exemplary embodiment in detail. A difference from FIG. 3 is that when a digital high-pass filter and a digital low-pass filter are integrated into one system, there are two systems in the case of the second exemplary embodiment. Portions similar to those of FIG. 3 are denoted by similar reference numerals, and description thereof will be omitted.

FIG. 6 illustrates a first-system digital high-pass filter (digital HPF) 202, a second-system digital high-pass filter (digital HPF) 207, a first-system digital low-pass filter (digital LPF) 203, and a second-system digital low-pass filter (digital LPF) 208. Each system can have characteristics showing which frequency band is a target, by changing a cutoff frequency of each filter.

In the present case, the system 2 (second system) targeting a high-frequency band is switched to the system 1 (first system) targeting a low-frequency band according to an exposure start signal entered from an operation unit 117. The system 1 performs "performance emphasized" filter processing at a high vibration suppression rate in all areas of body shakes+hand shakes (e.g., 1 to 15 Hz), and provides a high vibration suppression effect even in a low band such as body shakes. Thus, the system 1 is used during the exposure. A problem of the system 1 is easy movement of the shift lens 103 to the mechanical driving end. On the other hand, the system 2 performs "appearance emphasized" filter processing at a highest vibration suppression rate near a given specific frequency (e.g., 5 Hz), and is used during processing other than exposure.

A digital filter intermediate value changing unit 205 changes an intermediate value of the first-system digital low-pass filter 203 to a preset predetermined value according to an exposure start signal entered from the operation unit 117. A discontinuous point connection unit 206 continuously connects discontinuous points of the system 2 before switching and the system 1 after the change of the intermediate value. A number of systems is not necessarily two but a similar operation can also be performed on a plurality of systems that exceeds two. The system switching is carried out by the discontinuous point connection unit 206 to a vibration correction amount calculation unit 204. More specifically, the vibration correction amount calculation unit 204 switches an entry for vibration correction amount calculation between the systems 1 and 2 based on an instruction from the discontinuous point connection unit 206. As described below referring to FIGS. 7A and 7B, gains and losses are found in both cases where the discontinuous points are connected and where not connected. However, the discontinuous point connection unit 206 can operate as a system switching unit even when the discontinuous points are not connected.

Figure 7A:
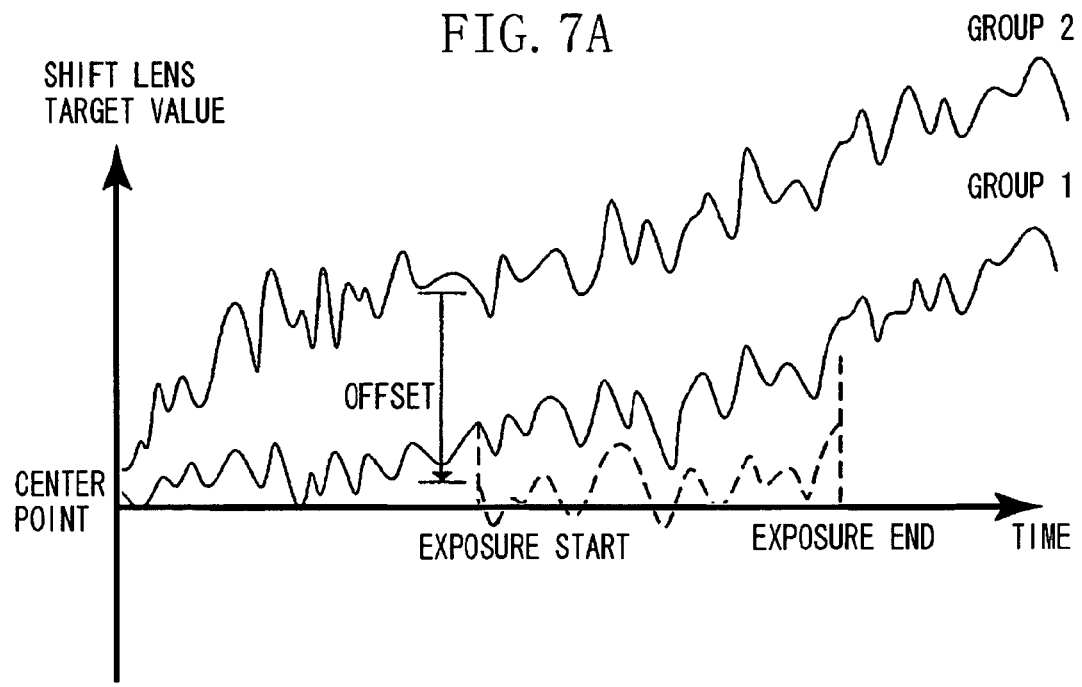
FIGS. 7A and 7B are waveform charts illustrating shift lens target values according to the second exemplary embodiment of the present invention.
Figure 7B:
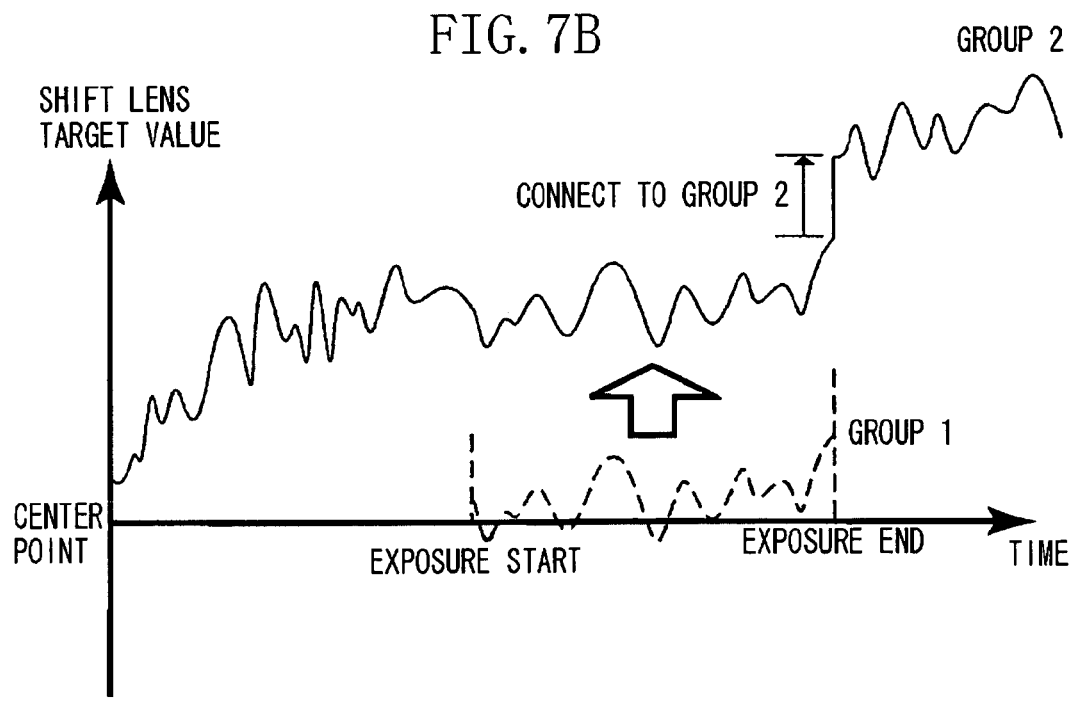

FIGS. 7A and 7B are waveform charts of the second exemplary embodiment similar to those of FIGS. 4A and 4B: waveform charts when the intermediate value of the digital low-pass filter is changed, where an X axis indicates a time axis, a Y axis indicates a shift lens target value, an intersection point between the X and Y axes is time zero, and the shift lens target value is a center point of a driving range.

Waveforms of the systems 1 and 2 indicated by solid lines of FIG. 7A represent output waveforms of the digital low-pass filters 208 and 203. In control processing illustrated in FIG. 7A, at the time of starting the exposure, an entry for calculating a vibration correction amount is switched from the system 2 to the system 1, and an intermediate value of the system 1 is simultaneously set to zero. At the end time of the exposure, the entry is switched again (returned) to the system 2. Thus, a shift lens target value during this period is a waveform indicated by a broken line.

The waveforms of the systems 1 and 2 indicated by the solid lines are rising since an influence of an intermediate value of last sampling on an output value of current sampling is accumulated. As a result, the target value approaches a driving limit of the shift lens 103 (away from the center point of the driving range).

The waveform indicated by the broken line is not rising waveform but a flat waveform because the influence of the intermediate value of last sampling on the output value of current sampling is cleared to eliminate the influence of accumulation. In this way, when the intermediate value is changed to the predetermined value, unlike the case of subtracting the offset at the time of starting the exposure as a constant at the output stage of the digital low-pass filter 203, the influence of accumulation thus far can be eliminated.

In the case of control processing of FIG. 7A, the system 2 is switched to the system 1 at the time of starting the exposure, and the intermediate value of the digital low-pass filter 203 of the system 1 is changed to a predetermined value to set its output value directly as a shift lens target value. This control processing is advantageous in that the shift lens 103 is driven nearer the center point. However, discontinuous points appear in the waveform at the time of changing the value. The discontinuous points are generated due to a difference between shift lens target values when the system 2 is switched to the system 1.

In the case of control processing of FIG. 7B, to continuously connect the discontinuous points generated in FIG. 7A, the target value is incremented by an offset amount. More specifically, when the system 2 is switched to the system 1, an offset (offset of FIG. 7A) generated by an output value of the system 2 at the time of switching and an output value which is changed from the intermediate value of the digital low-pass filter 203 of the system 1 to a predetermined value, is first calculated and stored. Then, this offset is added to the output of the digital low-pass filter 203. The adding of the offset is continuously carried out during the exposure. Then, the offset addition is finished at end timing of the exposure, and the process is switched (returned) again to the system 2.

In FIG. 7B, as in the case of FIG. 7A, a broken-line waveform indicates an output waveform when an intermediate value is set to zero at the system 1. A solid-line waveform indicates a situation where the waveform is raised by an offset amount during the exposure to be connected to the system 2. Thus, after the end of the exposure period, discontinuous points are generated because of switching to the system 2.

The control processing of FIG. 7B prevents generation of discontinuous points at the time of starting the exposure. As a result, change of a field angle of shooting before or after the start of the exposure can be prevented.

Values appropriate for constants a, b, and c of a primary recursive digital low-pass filter will be described as following examples. a=0.999993, b=0.000003, and c=0.000003 in the case of a cutoff frequency of 0.1 Hz when a sampling cycle of the digital low-pass filter 203 is 10 KHz. a=0.999937, b=0.000031, and c=0.000031 in the case of a cutoff frequency of 0.1 Hz when a sampling cycle of the digital low-pass filter 208 is 10 KHz.

Figure 8:
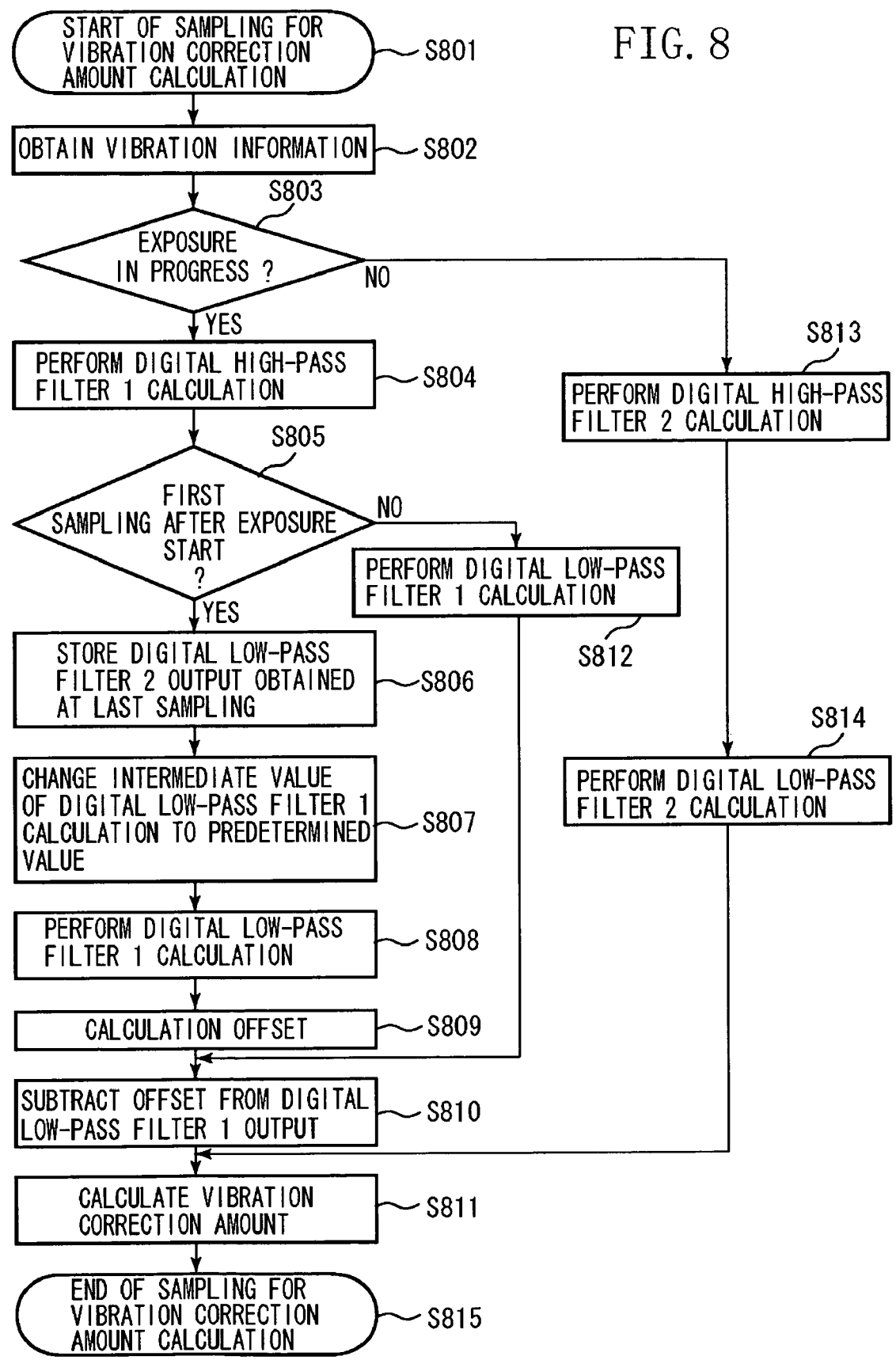
FIG. 8 is a flowchart illustrating an operation for vibration correction amount calculation according to the second exemplary embodiment of the present invention.

Next, referring to a flowchart of FIG. 8, operations performed by the digital filter intermediate value changing unit 205 and the discontinuous point connection unit 206 according to an exposure start signal from the operation unit 117 will be described when a vibration correction amount is calculated based on a vibration signal from the vibration detection unit 114. The flowchart of FIG. 5 is directed to the filter of the 1-system filter. However, the flowchart of FIG. 8 of the second exemplary embodiment illustrates an operation of the 2-system filter illustrated in FIG. 6.

In step S801, the image stabilizing control unit 209 starts sampling for vibration correction amount calculation. In step S802, the image stabilizing control unit 209 obtains a value converted from analog data which is a vibration signal detected by the vibration detection unit 114 into digital data by the A/D conversion unit 201. In step S803, the image stabilizing control unit 209 determines whether the exposure is in progress. If a result of the determination shows that the exposure is not currently in progress (NO in step S803), the image stabilizing control unit 209 proceeds to step S813 to perform digital high-pass filter 2 calculation. In subsequent step S814, the image stabilizing control unit 209 performs digital low-pass filter 2 calculation. In other words, second-system calculation is performed in respective cases.

On other hand, if it is determined in step S803 that the exposure is currently in progress (YES in step S803), the image stabilizing control unit 209 proceeds to step S804 to perform digital high-pass filter 1 calculation. From this point on, the image stabilizing control unit 209 performs first-system calculation. In step S805, the image stabilizing control unit 209 determines whether an operation is first sampling after the start of the exposure. If the operation is the first sampling (YES in step S805), the image stabilizing control unit 209 proceeds to step S806 to store an output LPFOut2($n$−1) of the digital low-pass filter 2 obtained at last sampling. In subsequent step S807, the image stabilizing control unit 209 changes an intermediate value of the digital low-pass filter 1 calculation to a predetermined value (see FIGS. 7A and 7B). When the intermediate value is changed to the predetermined value, the intermediate value is changed to zero.

In step S808, the image stabilizing control unit 209 performs digital low-pass filter 1 calculation reflecting the change of the intermediate value to the predetermined value. The result is an output LPFOut1($n$). In step S809, the image stabilizing control unit 209 calculates a difference between the outputs LPFOut1($n$) and LPFOut2($n$−1) which become discontinuous points. This difference will be referred to as an offset (FIGS. 7A and 7B). In step S810, the image stabilizing control unit 209 subtracts the offset from the output of the digital low-pass filter 1. Thus, as illustrated in FIGS. 7A and 7B, the discontinuous points generated after the intermediate value change can be continuously connected.

If it is determined in step S805 that the operation is not first sampling (NO in step S805), the image stabilizing control unit 209 proceeds to step S812 to perform digital low-pass filter 1 calculation. Then, in step S810, by using a precalculated offset, the image stabilizing control unit 209 subtracts the offset from the digital low-pass filter output.

In this way, the digital low-pass filter calculation is carried out during the exposure.

After the completion of the exposure, the image stabilizing control unit 209 proceeds to step S813 to perform digital high-pass filter 2 calculation. Then, in step S814, the image stabilizing control unit 209 performs digital low-pass filter 2 calculation but does not subtract the offset.

In step S811, the image stabilizing control unit 209 calculates a vibration correction amount by using the calculated digital low-pass filter output. In step S815, the image stabilizing control unit 209 finishes the sampling for the vibration correction amount calculation.

According to the second exemplary embodiment, the imaging apparatus includes the plurality of systems (systems 1 and 2) that follow a path from the vibration detection unit 114 through the digital low-pass filter to the calculation of the vibration correction amount. The image stabilizing control unit 209 switches a system for calculating a vibration correction amount from the system 2 to the system 1 immediately before exposure at an imaging unit (image sensor) 109. At this switching timing, the image stabilizing control unit 209 changes the intermediate value of the digital low-pass filter unit stored as a calculation result of the feedback unit in the system 1 to which the calculation is switched, to the predetermined value. Thus, an increase in a driving amount of the correction unit can be prevented, in other words, an influence of large vibrations such as a panning operation can be eliminated, to enable appropriate image stabilization.

The image stabilizing control unit 209 continuously reconnects, at the timing of changing the intermediate value to the predetermined value (zero), the discontinuous points of the output of the digital low-pass filter 203 generated after the change. As a result, the discontinuous points generated after the change of the intermediate value can be continuously connected.

Figure 9E:
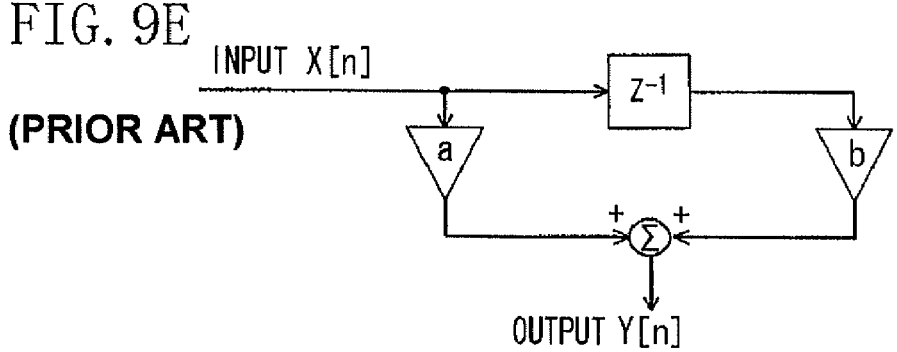

According to the first and second exemplary embodiments of the present invention, the primary recursive digital low-pass filter is used. However, the present invention is not limited to the primary recursive digital low-pass filter, but can be applied to a nonrecursive digital low-pass filter. As described above referring to FIG. 9E, in the nonrecursive digital low-pass filter, the output of the delay element $Z^{-1}$ is an intermediate value. Thus, similar effects can be obtained by setting this value to a predetermined value such as zero at the time of starting exposure.

Furthermore, the order of the digital low-pass filter is not limited to the primary. As a number of delay elements $Z^{-1}$ increases, the order increases, resulting in an increase of a number of intermediate values. However, effects similar to those of the exemplary embodiments can be obtained by changing the plurality of intermediate values uniformly to a predetermined value at the time of starting exposure.

The present invention can be achieved by executing the following processing: a storage medium recording program codes of software for realizing functions of the exemplary embodiments is supplied to a system or an apparatus, and the program codes stored in the storage medium is read by a computer (CPU or MPU) of the system or the apparatus. In this case, the program codes read from the storage medium themselves realize the functions of the exemplary embodiments, and the program codes and the storage medium storing the program codes constitute the invention.

Each exemplary embodiment can be achieved by executing the following method: a storage medium (or recording medium) recording program codes of software for realizing functions of the exemplary embodiments is supplied to a system or an apparatus, and the program codes stored in the storage medium is read by a computer (CPU or MPU) of the system or the apparatus. In this case, the program codes read from the storage medium themselves realize the functions of the exemplary embodiments, and the program codes and the storage medium storing the program codes constitute the invention. The invention is not only realized by executing the read program codes by the computer, but also based on instructions of the program codes, an operating system (OS) running on the computer executes part or all of actual processing to realize the functions of the exemplary embodiments.

The program codes read from the storage medium can be written in a memory of a function extension card inserted into the computer or a function extension unit connected to the computer. Then, based on instructions of the program codes, a CPU provided in the function extension card or the function extension unit executes part or all of actual processing to realize the functions of the exemplary embodiments.

When the present invention is applied to the storage medium, the program codes corresponding to the aforementioned procedure are stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-061859 filed Mar. 11, 2008, which is hereby incorporated by reference herein in its entirety.

What is claimed is:

1. A shake compensation device comprising:
   a shake detection unit configured to detect shakes;
   a first filter unit configured to pass a first frequency band of signals based on the detection result from the shake detection unit, wherein the filter unit includes a delay element that has an intermediate value;
   a second filter unit, which executes processing in parallel with the first filter unit, configured to pass a second frequency band of the signals, wherein the second frequency band is different from the first frequency band;
   an intermediate value changing unit configured to change the intermediate value of the delay element in the first filter unit to a predetermined value when exposure starts;
   a connection unit configured to switch connection of the output of the second filter to the output of the first filter unit, wherein the connection unit calculates a difference between the output of the second filter unit before the immediate value changes and the output of the first filter after the intermediate value changes, as an offset value, and wherein the connection unit adds the offset value to the output of the first filter unit after the intermediate value changes;
   a calculation unit configured to calculate a shake correction amount based on the output from one of the first filter unit and the second filter unit; and
   a correction unit configured to compensate the shakes to move a compensation member based on the shake correction amount.

2. The device according to claim 1, wherein the predetermined value is zero.

3. The device according to claim 1 is comprised in an image capturing apparatus.

4. The device according to claim 1 is comprised in an optical apparatus.

5. The device according to claim 1, wherein the second frequency band is narrower than the first frequency band.

6. A method of a shake compensation device, the shake compensation device includes a first filter unit having a delay element and a second filter unit that executes processing in parallel with the first filter unit, and to compensate an image blur to move a compensation member, comprising:
   detecting shakes;
   filtering to pass a first frequency band of signals based on the detection result from the shake detection by the first filtering unit, wherein the delay element has an intermediate value;
   filtering to pass second frequency-band of the signals by the second filtering unit, wherein the second frequency band is different from the first frequency band;
   changing the intermediate value of the delay element in the first filter unit to a predetermined value when exposure starts;
   connecting the filtering output to pass first frequency band of signals to the filtering output to pass second frequency band of signals, and calculating an offset value between the filtering output to pass first frequency band of signals after the intermediate value changes and the filtering output to pass second frequency band of signals before the intermediate value changes, and adding the offset value to the filtering output to pass first frequency band of signals after the intermediate value changes;
   calculating a shake correction amount based on the filtering output to pass first frequency band of signals and the filtering output to pass second frequency band of signals;
   compensating the shakes to move the compensation member based on the shake correction amount.

7. The method according to claim 6, wherein the predetermined value is zero.

8. The method according to claim 6, wherein the second frequency band is narrower than the first frequency band.

* * * * *